United States Patent
Engfehr et al.

(10) Patent No.: US 10,145,319 B1
(45) Date of Patent: Dec. 4, 2018

(54) CONTROL STRATEGY FOR IMPROVED SUBSTITUTION CAPABILITY IN DUAL FUEL ENGINE SYSTEM

(71) Applicant: Caterpillar Inc., Peoria, IL (US)

(72) Inventors: Matthew Jordan Engfehr, Dunlap, IL (US); Nathan Atterberry, Washington, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/877,822

(22) Filed: Jan. 23, 2018

(51) Int. Cl.
*B60T 7/12* (2006.01)
*F02D 41/00* (2006.01)
*F02D 35/02* (2006.01)
*F02D 17/02* (2006.01)
*F02D 41/26* (2006.01)

(52) U.S. Cl.
CPC ....... *F02D 41/0027* (2013.01); *F02D 35/023* (2013.01); *F02D 41/0087* (2013.01); *F02D 17/02* (2013.01); *F02D 41/26* (2013.01); *F02D 2200/604* (2013.01)

(58) Field of Classification Search
CPC .... F02B 19/1052; F02B 19/1085; F02D 3/04; F02D 19/024; F02D 33/00; F02D 35/0046; F02D 41/0025; F02D 2250/32; F02D 13/06; F02D 41/123
USPC ......... 701/101, 103, 104, 111, 112, 114, 115
See application file for complete search history.

(56) References Cited

U.S. PATENT DOCUMENTS

| | | | |
|---|---|---|---|
| 6,269,300 B1 | 7/2001 | Moore-McKee et al. | |
| 6,354,268 B1 | 3/2002 | Beck et al. | |
| 6,543,395 B2 | 4/2003 | Green | |
| 7,533,651 B2 | 5/2009 | Surnilla | |
| 9,464,583 B2 | 10/2016 | Zur Loye et al. | |
| 2014/0182560 A1 | 7/2014 | Veit et al. | |
| 2015/0128919 A1 | 5/2015 | Ibrahim | |
| 2015/0219027 A1* | 8/2015 | zur Loye | F02D 41/0027 60/603 |
| 2015/0252741 A1* | 9/2015 | Sixel | F02D 19/0642 123/472 |
| 2015/0275813 A1 | 10/2015 | Dunn et al. | |
| 2015/0361943 A1* | 12/2015 | Sixel | F02P 5/153 123/406.45 |
| 2016/0084179 A1* | 3/2016 | Holst | F02D 19/0642 123/406.45 |
| 2016/0319765 A1* | 11/2016 | Neaville | F02D 41/26 |
| 2017/0089273 A1 | 3/2017 | Thomas et al. | |
| 2017/0122246 A1* | 5/2017 | Ottikkutti | F02D 41/402 |
| 2018/0142629 A1* | 5/2018 | Stockner | F02D 19/0623 |

FOREIGN PATENT DOCUMENTS

WO 2016154086 A1 9/2016

\* cited by examiner

*Primary Examiner* — John Kwon

(74) *Attorney, Agent, or Firm* — Mattingly Burke Cohen & Biederman

(57) ABSTRACT

Operating a dual fuel engine system includes firing combustion cylinders on a liquid fuel or both the liquid fuel and a gaseous fuel, and selectively cutting out at least one of the combustion cylinders based on a cylinder pressure parameter. A subset of those combustion cylinders remaining active after cylinder cutout is fired at a gas-to-liquid substitution ratio based on a user-settable combustion optimization term. The optimization term can include an efficiency term, an emissions term, and/or a fuel cost term, each of which has a finite range of values including a diesel equivalency value.

20 Claims, 4 Drawing Sheets

CONTROL STRATEGY FOR IMPROVED SUBSTITUTION CAPABILITY IN DUAL FUEL ENGINE SYSTEM

TECHNICAL FIELD

The present disclosure relates generally to varying gas-to-liquid fuel substitution in a dual fuel engine system and, more particularly, to varying substitution according to a combustion optimization term during cylinder cutout.

BACKGROUND

Internal combustion engines are well known and widely used for propulsive power, electrical power generation, gas compression, liquid and gas transfer, and in various industrial applications. In a conventional four-cycle or two-cycle operating scheme, fuel and air is combusted within an engine cylinder to produce a rapid rise in pressure and induce linear travel of a piston coupled with a rotatable crankshaft. Spark-ignited engines typically employ a liquid petroleum distillate fuel such as gasoline, or various gaseous fuels in the nature of natural gas, methane, propane, and various mixtures such as biogas, landfill gas, and mine gas. Compression-ignition engines typically utilize fuels such as diesel distillate fuel, biodiesel, and still others. In recent years there has been significant interest in development of engines and operating strategies that are flexible with regard to fuel utilization. Fuel prices can be fairly dynamic and, moreover, certain fuels that have realized relatively increased abundance in recent years, such as natural gas, can have desirable combustion or emissions properties which are sought to be exploited. One type of engine design that allows for operation with different fuel types combines both a diesel distillate fuel and natural gas. Diesel alone is relatively easy to compression ignite, but can produce undesired emissions. Where natural gas is used as a fuel in a conventional compression-ignition engine, without modification the mixture of natural gas and air can fail to ignite, knock, or have combustion stability problems. Various strategies have been developed that predominantly burn natural gas while using a relatively smaller amount of diesel as a so-called pilot fuel. The diesel pilot fuel can ignite to in turn ignite the natural gas, offering relative predictability and reliability in the timing and manner of ignition and otherwise combining certain advantages of both fuel types. One example of such an engine is known from U.S. Pat. No. 6,032,617 to Willi et al.

The term "substitution ratio" is commonly used to describe the relative contributions of diesel fuel and gaseous fuel in a dual fuel engine at any one time, and can be understood generally as the extent to which gaseous fuel is substituted for what would otherwise be diesel fuel during single fuel engine operation. In certain dual fuel engines, particularly at relatively low engine load operating states, controlling the delivery of a relatively small amount of gaseous fuel can be difficult due at least in part to hardware and controllability limitations, or ignitability and/or other problems can be observed. Standard practice often includes disabling gaseous fuel delivery at low loads or other operating conditions where gaseous fuel utilization can be challenging.

SUMMARY OF THE INVENTION

In one aspect, a method of operating a dual fuel engine system includes firing each of a plurality of combustion cylinders in the dual fuel engine system on a liquid fuel or on both the liquid fuel and a gaseous fuel. The method further includes receiving a cylinder pressure signal, and cutting out at least one of the plurality of combustion cylinders based on the cylinder pressure signal. The method further includes firing those combustion cylinders which remain active after the cutting out of at least one of the plurality of combustion cylinders, and reading a stored combustion optimization term. The method still further includes substituting, at a gas-to-liquid substitution ratio that is based on the combustion optimization term, gaseous fuel for liquid fuel in a subset of those combustion cylinders which remain active after the cutting out of at least one of the plurality of combustion cylinders.

In another aspect, a dual fuel engine control system includes a pressure sensor structured for positioning in fluid communication with one of a plurality of combustion cylinders in a dual fuel engine system, and an electronic control unit structured to couple with each of the pressure sensor, a plurality of liquid fuel admission valves, and at least one gaseous fuel admission valve. The electronic control unit is further structured to output liquid fueling commands and gaseous fueling commands, such that each of the plurality of combustion cylinders is fired on a liquid fuel or on both of the liquid fuel and a gaseous fuel. The electronic control unit is further structured to receive a cylinder pressure signal from the pressure sensor, and cut out at least one of the plurality of combustion cylinders from firing based on the cylinder pressure signal. The electronic control unit is still further structured to read a stored combustion optimization term, and output liquid fueling commands and gaseous fueling commands, such that a subset of those combustion cylinders which remain active is fired at a gas-to-liquid substitution ratio that is based on the combustion optimization term.

In still another aspect, a dual fuel engine system includes an engine having an engine housing with a plurality of combustion cylinders formed therein, and a dual fuel system coupled with the engine. The dual fuel system includes a plurality of liquid fuel admission valves for conveying a liquid fuel into the plurality of combustion cylinders, and at least one gaseous fuel admission valve for conveying a gaseous fuel into the plurality of combustion cylinders. The dual fuel engine system further includes a dual fuel engine control system having a plurality of pressure sensors in fluid communication with the plurality of combustion cylinders, and an electronic control unit. The electronic control unit is structured to output liquid fueling commands and gaseous fueling commands, such that each of the plurality of combustion cylinders is fired on a liquid fuel or on both of the liquid fuel and a gaseous fuel. The electronic control unit is further structured to receive a cylinder pressure signal from the pressure sensor, and cut out at least one of the plurality of combustion cylinders from firing based on the cylinder pressure signal. The electronic control unit is still further structured to read a stored combustion optimization term, and output liquid fueling commands and gaseous fueling commands, such that a subset of those combustion cylinders which remain active is fired at a gas-to-liquid substitution ratio that is based on the combustion optimization term.

DETAILED DESCRIPTION

Figure 1:
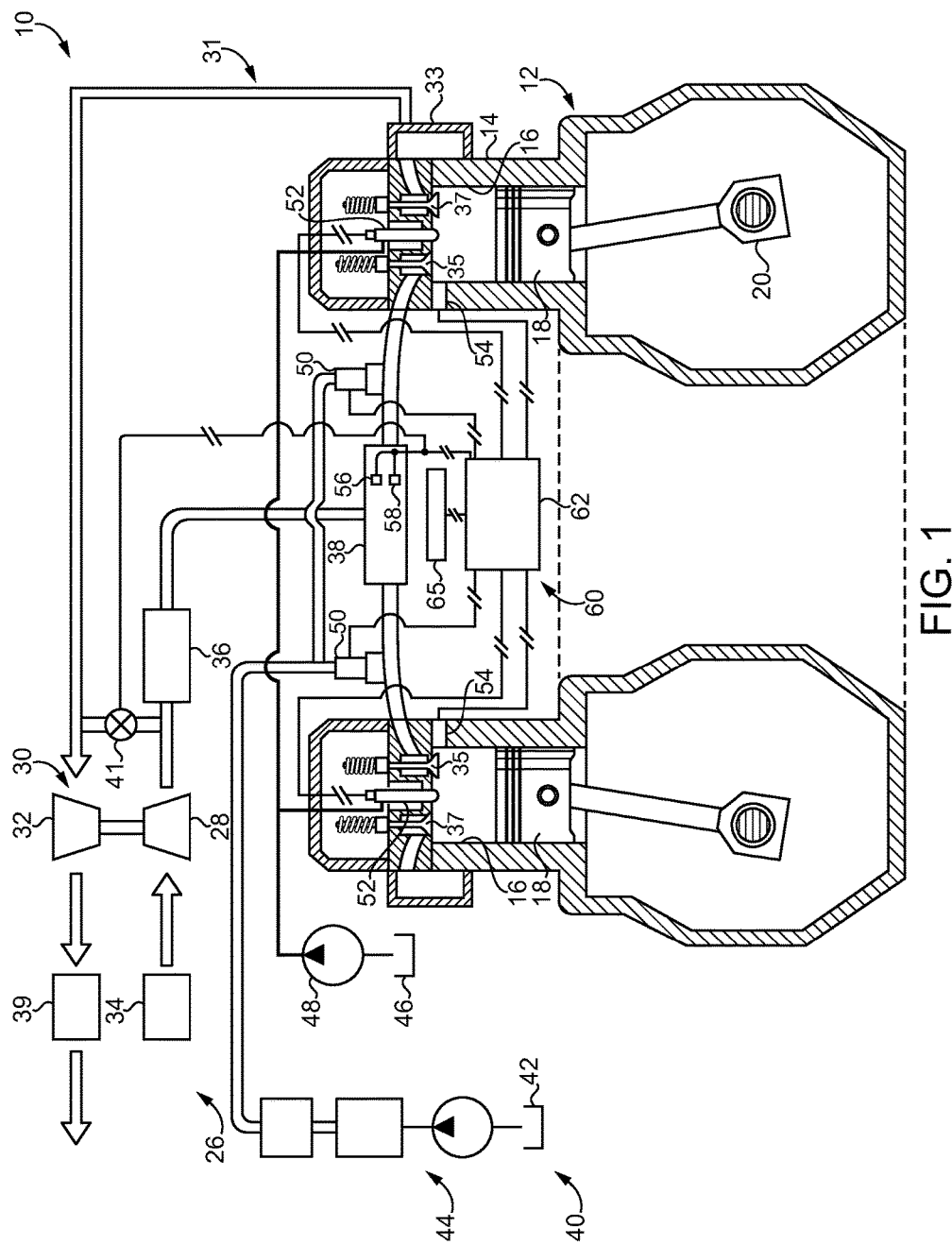
FIG. 1 is a side diagrammatic view of a dual fuel engine system, according to one embodiment.

Referring to FIG. 1, there is shown a dual fuel engine system 10 according to one embodiment, and including an internal combustion dual fuel engine 12 having an engine housing 14 with a plurality of pistons 18 positioned at least partially within a plurality of combustion cylinders 16 formed in engine housing 14. Dual fuel engine system 10 (hereinafter "engine system 10") also includes a crankshaft 20 coupled with pistons 18 in a generally conventional manner. In a typical embodiment, internal combustion engine 12 (hereinafter "engine 12") is a multi-cylinder engine with cylinders 16 in an in-line configuration, a V-configuration, or any other suitable configuration. Pistons 18 are movable within engine housing 14 to compress a mixture of air and fuel in corresponding combustion cylinders 16 to an auto-ignition threshold. A liquid fuel such as diesel distillate liquid fuel serves as a pilot fuel igniting a main charge of a gaseous fuel such as natural gas, or the liquid fuel can serve as the predominant or only combusted fuel, depending upon present operating conditions. As will be further apparent from the following description, engine system 10 is uniquely configured for varying and/or optimizing substitution of gaseous fuel for liquid fuel in a cylinder cutout environment.

Engine system 10 further includes an intake system 26 having an air inlet 34 structured to feed intake air for combustion to a compressor 28 in a turbocharger 30. Air compressed by way of compressor 28 can be fed through an aftercooler 36, and thenceforth to an intake manifold 38. Engine system 10 further includes an exhaust system 31 structured to feed engine exhaust from an exhaust manifold 33 through a turbine 32 of turbocharger 30 and thenceforth to an exhaust outlet 39. An electrically activated exhaust gas recirculation or "EGR" valve 41 is positioned fluidly between exhaust system 31 and intake system 26 and structured to supply exhaust gases for combination with incoming air for combustion, the significance of which will be further apparent from the following description. Intake system 26 could convey a mixture of gaseous fuel, air, and recirculated exhaust gas to intake manifold 38, or a mixture of recirculated exhaust gas and air, only air, or air and gaseous fuel, depending upon system design and operating state. The location of gaseous fuel delivery could thus be upstream of compressor 28, fluidly between compressor 28 and intake manifold 38, directly into intake manifold 38, into intake runners as shown in FIG. 1, or by way of direct gaseous fuel injection into cylinders 16. The location of delivery of recirculated exhaust gas could also vary from that depicted in FIG. 1. Exhaust gases can be conveyed from turbine 32 to exhaust outlet 39 by way of one or more exhaust aftertreatment mechanisms (not shown), such as a particulate filter, a diesel oxidation catalyst, a selective catalytic reduction or "SCR" mechanism, or potentially still others. A second turbocharger stage could also be positioned fluidly between turbine 32 and exhaust outlet 39 in some embodiments.

Engine system 10 further includes a dual fuel system 40 having a first fuel supply 42 that is a gaseous fuel supply, and gaseous fuel vaporization and pressurization equipment 44 structured to convert gaseous fuel from a liquid form to a gaseous form supplied at a pressure suitable for delivery at a desired location in engine system 10. The gaseous fuel contained in first fuel supply 42 could include liquefied natural gas, methane, propane, or a variety of other fuels stored in a cryogenically liquefied state, for example. Dual fuel system 40 further includes a second fuel supply 46 that is a liquid fuel supply, and one or more liquid fuel pressurization pumps 48 structured to convey and pressurize liquid fuel between second fuel supply 46 and a desired delivery location in engine system 10. In a practical implementation strategy, dual fuel system 40 is coupled with engine 12 and has a plurality of liquid fuel admission valves 52, such as liquid fuel injectors. Liquid fuel admission valves 52 can each be positioned at least partially within one of combustion cylinders 16, although port injected or still other designs could still fall within the scope of the present disclosure. Liquid fuel admission valves 52 are structured to convey liquid fuel such as a diesel distillate fuel into combustion cylinders 16 according to any suitable pressurization and delivery strategy, such as a unit pump design or a common rail design, for example. Dual fuel system 40 further includes at least one gaseous fuel admission valve 50 structured to convey gaseous fuel into combustion cylinders 16. As noted above, delivery of gaseous fuel could be by way of direct injection, injection into intake runners, into intake manifold 38, or by way of delivery upstream of compressor 28.

Engine system 10 further includes a dual fuel engine control system 60 (hereinafter "control system 60") including a pressure sensor 54, and typically a plurality of pressure sensors for positioning in fluid communication with each one of combustion cylinders 16. In a practical implementation strategy, pressure sensor 54, described herein in the singular but intended to apply to any number of analogously configured pressure sensors in control system 60, may be an in-cylinder pressure sensor which can be understood, for example, to include a movable or deformable element (not shown) that is responsive to fluid pressure in a corresponding one of combustion cylinders 16. Pressure sensor 54 can produce an electrical output such as a voltage or a current that provides data indicative of cylinder pressure in real time.

Control system 60 also includes an electronic control unit 62 structured to receive cylinder pressure data from pressure sensor 54, and to act upon that data in a manner further discussed herein. Electronic control unit 62 is further structured to couple with and receive data from pressure sensor 54, and also structured to couple with liquid fuel admission valves 52 and the one or more gaseous fuel admission valves 50, each of which may be electrically-actuated. Control system 60 also includes an intake manifold pressure or "IMAP" sensor 56, an intake manifold temperature or "IMAT" sensor 58, and a user interface 65. Electronic control unit 62 may be in communication with IMAP sensor 56 to receive data indicative of intake manifold pressure or turbocharger boost pressure, in communication with IMAT sensor 58 to receive data indicative of intake manifold temperature, and also in communication with each liquid fuel admission valve 52 and gaseous fuel admission valve 50. Electronic control unit 62 is further in communication with EGR valve 41, and embodiments are contemplated where electronic control unit 62 is in communication with a gas exchange valve such as an intake valve 35, or potentially an exhaust valve 37, for controlling combustion characteristics affected by gas exchange valve position or timing, within combustion cylinders 16. While it is contemplated that intake valves 35 and exhaust valves 37 will be cam-actuated, the opening timing or closing timing of those valves could be varied by way of electrical actuators (not shown) according to known techniques, consistent with the aims of the present disclosure.

Figure 2:
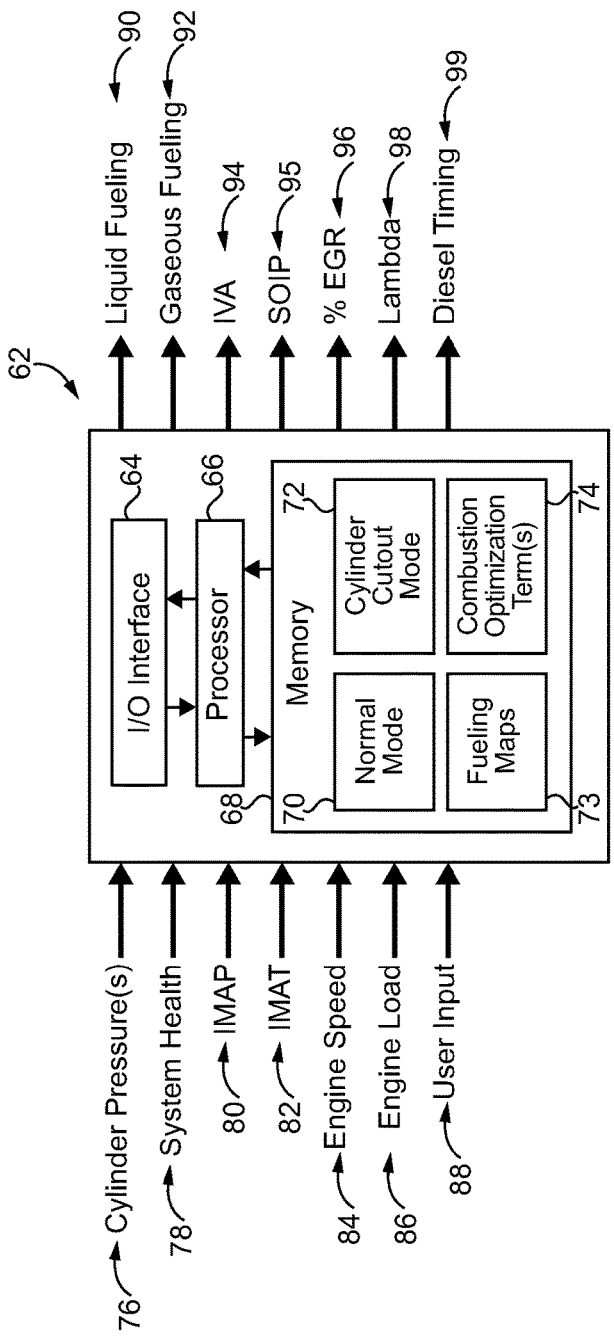
FIG. 2 is a functional block diagram of an electronic control unit for a dual fuel engine control system, according to one embodiment.

Referring now also to FIG. 2, there is shown a functional block diagram of electronic control unit 62 illustrating example elements thereof. Electronic control unit 62 can include an input/output or I/O interface 64, and a processor 66. Processor 66 can include any suitable computerized data processing device such as a microprocessor, or a microcontroller. Processor 66 may be coupled with a computer readable memory 68 that stores computer executable instructions and data, for monitoring and/or controlling various aspects of operation of engine system 10. The computer executable instructions can include normal mode instructions 70 (hereinafter "normal mode 70"), and cylinder cutout mode instructions 72 (hereinafter "cutout mode 72"). As will be further apparent from the following description, some of the time electronic control unit 62 can control fueling of engine system 10 according to a first set of criteria and in a first manner, executing normal mode 70. At other times, including when one or more combustion cylinders are cut out from firing, electronic control unit 62 can control fueling according to other criteria, executing cutout mode 72. Fueling maps are shown at 73, and a stored combustion optimization term(s) at 74, as further discussed herein. Fueling maps 73 may serve as the basis for liquid fueling and/or gaseous fueling commands produced in each of normal mode 70 and cutout mode 72, or different fueling maps could be used in the different modes.

In FIG. 2 electronic control unit 62 is depicted receiving a plurality of different inputs that can be used in controlling and/or monitoring engine system operation in accordance with the present disclosure, and a plurality of different outputs. Inputs can include cylinder pressure 76, namely, a cylinder pressure signal that is indicative of an indicated mean effective pressure or IMEP and based on data produced by pressure sensor 54, a system health input 78, an IMAP input 80, and an IMAT input 82. Electronic control unit 62 can additionally receive an engine speed input 84, an engine load input 86, and a user input 88 such as from user interface 65. Outputs can include liquid fueling commands 90, gaseous fueling commands 92, an intake valve actuation or "IVA" command 94, a start of injection pressure or "SOIP" command 95, an exhaust gas recirculation or % EGR command 96, a Lambda command 98, and a diesel timing command 99, to name a few examples. Electronic control unit 62 receives the various inputs and, based on the inputs, produces control command outputs to vary operation of engine system 10 to desired effect. During operation according to normal mode 70, electronic control unit 62 may produce and output liquid fueling commands and gaseous fueling commands 90 and 92, respectively, such that each combustion cylinder 16 is fired on a liquid fuel or on both of the liquid fuel and a gaseous fuel. It can therefore be understood that normal mode 70 can include firing of all of the combustion cylinders in engine system 10 in each engine cycle, whether the firing occurs on liquid fuel or on both the liquid fuel and gaseous fuel. In the cylinder cutout mode 72, electronic control unit 62 can produce and output liquid fueling commands and gaseous fueling commands 90 and 92, respectively, such that a subset of those combustion cylinders 16 which remain active after cutting out at least one cylinder from firing, is fired at a gas-to-liquid substitution ratio that is based on one or more stored combustion optimization terms 74. The purposes and effect of combustion optimization terms 74 is further discussed herein.

Electronic control unit 62 may also be structured to receive a cylinder pressure signal from pressure sensor 54 as noted above, and to cut out at least one of combustion cylinders 16 from firing based on the cylinder pressure signal 76. Electronic control unit 62 may further be structured to read a stored combustion optimization term 74, for implementation in the production of liquid fueling commands 90 and gaseous fueling commands 92 for the subset of those combustion cylinders remaining active.

Those skilled in the art will be familiar with the desirability of cylinder cutout for certain engines under certain conditions, where cylinders that would otherwise be fired are selectively not fired, and a load demand of the engine accommodated by less than all of the theoretically available combustion cylinders. Cylinder cutout strategies can enable improved performance and improved efficiency at least in certain conditions. Cylinder cutout is, moreover, typically implemented where engine load demand is relatively low such as when an engine is operating at low idle. As noted above, due to operational challenges past conventional practice has been to disable gaseous fuel delivery at low substitution levels and at low engine operating loads, at least for dual fuel engines designed for relatively high substitution operation. Another problem is an observed loss in efficiency of combustion where relatively high amounts of gaseous fuel substitution are attempted at low operating loads, due at least in part to poor combustion of the gaseous fuel. Moreover, the relative importance of certain factors such as efficiency and emissions can vary from operator to operator, or can change over time. These factors have resulted in challenges for efficient dual fuel engine system operation and flexibility in substitution. Such challenges may be particularly acute where dynamic fuel prices, supply reliability, or still other factors come into play. The present disclosure contemplates balancing tradeoffs in substitution, efficiency, emissions, and potentially still other factors, by utilizing in-cylinder pressure information to determine an optimal number of active firing cylinders, and by determining a number of cylinders that are optimally used for substituting gas. Monitoring combustion in cylinders remaining active after cylinder cutout using in-cylinder pressure information can also allow electronic control unit 62 to control each cylinder to a desired combustion characteristic that is a function of gas substitution, % EGR, SOIP, IVA, Lambda, and diesel timing at least at a given operating engine speed and load condition. These principles are believed to improve substitution capability, thus providing fuel cost benefits and balancing tradeoffs in fuel efficiency and fuel cost savings.

Those skilled in the art will further be familiar with the concept of pressure margin, relating to excess in-cylinder pressures, typically characterized as IMEP, over and above in-cylinder pressures needed to accommodate a given engine load demand. By monitoring in-cylinder pressures, electronic control unit 62 can determine whether sufficient pressure margin, or another pressure property, indicates not all cylinders need to be firing. Another way to understand this principle is that electronic control unit 62 can determine whether some, and if so how many, cylinders can be cut out from firing, and engine load demand accommodated by less than all of the theoretically available combustion cylinders. Electronic control unit 62 can also determine an optimum number of those cylinders remaining active after cylinder cutout that can be used for gaseous fuel substitution. Determining the optimum number of cylinders for substitution could be based on a substitution distributability criterion. For instance, based on an amount of or substitution ratio of gaseous fuel to be delivered in a given engine cycle, electronic control unit 62 could determine an optimum number of cylinders among which to distribute the gaseous fuel delivery. In certain cases, the optimum number of cylinders could include all the cylinders currently firing, whereas in other cases the optimum number could include less than all, in other words a subset only, of the cylinders currently firing. Another way to understand the substitution distributability criterion is as a measure of the relative extent to which gaseous fuel substitution can be distributed among combustion cylinders in a given engine cycle. A relatively small amount of gaseous fuel can, in general terms, be more readily and effectively distributed among a lesser number of cylinders, and vice versa. Engines designed for higher levels of gaseous fuel substitution may be more challenging to operate at lower substitution levels and, accordingly, a lesser number of substituting cylinders might be selected during cylinder cutout. Analogously, in engines designed for lower levels of gaseous fuel substitution, a greater number of cylinders might be selected during cylinder cutout. Greater precision and control of relatively small amounts of gaseous fuel delivery could enable gaseous fuel substitution to be distributed among a greater number of combustion cylinders, whereas lesser precision and control of gaseous fuel delivery could justify gaseous fuel substitution distributed among a lesser number of combustion cylinders. Numbers of cylinders for substitution during cylinder cutout can be varied during operation to achieve desired combustion characteristics, as further discussed herein, and will depend at least in part upon user inputs that prioritize or otherwise give relative weights to those desired combustion characteristics, as further discussed herein. It will also be appreciated that a number of cylinders cut out can vary, and thus a number of cylinders presently substituting gas relative to a number of cylinders presently firing can also vary. The manner and extent to which electronic control unit 62 will vary gas-to-liquid substitution within those cylinders within which substitution is to occur will depend upon the combustion optimization term as further discussed herein.

In a practical implementation strategy, user interface 65 is coupled with electronic control unit 62 and structured to update combustion optimization term 74 responsive to a user input. Electronic control unit 62, after controlling gas-to-liquid substitution ratio based on a prior combustion optimization term, can vary the gas-to-liquid substitution ratio based upon the updated combustion optimization term. Also in a practical implementation, combustion optimization term 74 can be one of a plurality of user-settable combustion optimization terms stored on memory 68. The plurality of user-settable combustion optimization terms can include at least one of an efficiency term, an emissions term, or a fuel cost term. Each one of the user-settable combustion optimization terms may further have a finite range of values, and includes a diesel equivalency value within the corresponding finite range of values. The diesel equivalency value will typically but not necessarily occupy or define an extreme of the corresponding finite range. Another way to understand the user-settable combustion optimization term(s) is that a user can select one of a finite number of values by way of user interface 65 for the one or more of an efficiency term, emissions term, or fuel cost term. By selecting a value for one or more of these terms, a user can establish a relative priority for the associated factors of efficiency, emissions, or fuel cost. A user could also select a value for each of the combustion optimization terms that corresponds with what could be expected for diesel only operation, in other words, a diesel equivalency value.

Figure 3:
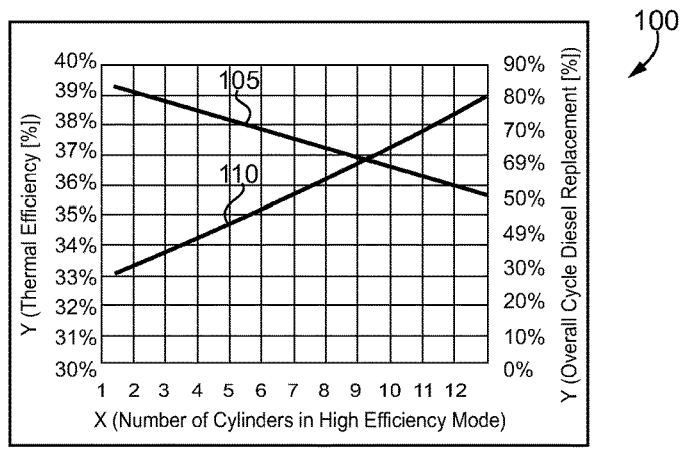
FIG. 3 is a graph comparing number of cylinders in high efficiency mode with thermal efficiency and diesel replacement parameters.

Turning now to FIG. 3, there is shown a graph 100 showing a number of cylinders, for an example 12-cylinder engine, operated in a high efficiency mode on the X-axis. High efficiency mode could be understood as a liquid fuel only or substantially liquid fuel only mode. On the left Y-axis is shown thermal efficiency. A curve 110 illustrates a relationship between thermal efficiency and the number of cylinders operated in high efficiency mode. For instance, when all 12 cylinders are operated in high efficiency mode a thermal efficiency of about 39% might be observed, whereas if only one cylinder is operated in high efficiency mode a thermal efficiency of about 33% might be observed. On the right hand Y-axis is shown overall cycle diesel replacement percent. A curve 105 illustrates a relationship between number of cylinders in high efficiency mode and diesel replacement percent. It can be noted that an overall cylinder diesel replacement percent might be just over 80% when one cylinder is operated in high efficiency mode, and might be about 50% when all 12 cylinders are operated in high efficiency mode.

Figure 4:
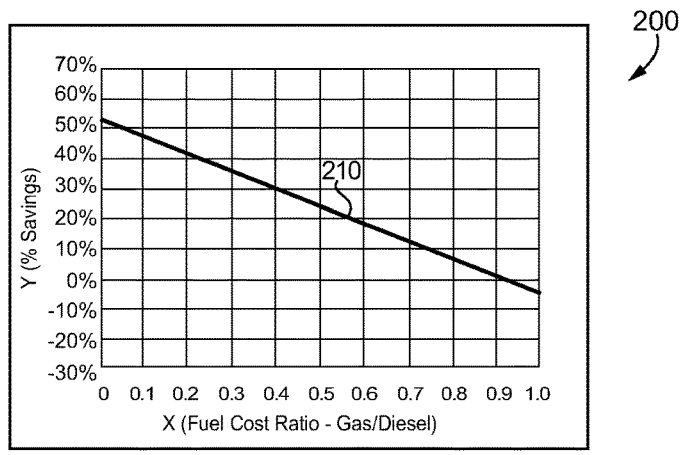
FIG. 4 is a graph of fuel cost ratio in comparison to percent cost savings.

Referring now to FIG. 4, there is shown another graph 200 illustrating fuel cost ratio of gaseous fuel to diesel fuel on the X-axis, in relation to percent cost savings on the Y-axis. At a fuel cost ratio of about zero, meaning gaseous fuel is so plentiful or readily available it can be considered to have zero cost, the percent savings might be about 55%, whereas at a fuel cost ratio of about 1, meaning gaseous fuel cost is about the same as diesel fuel cost, the percent savings is about −5%.

Figure 5:
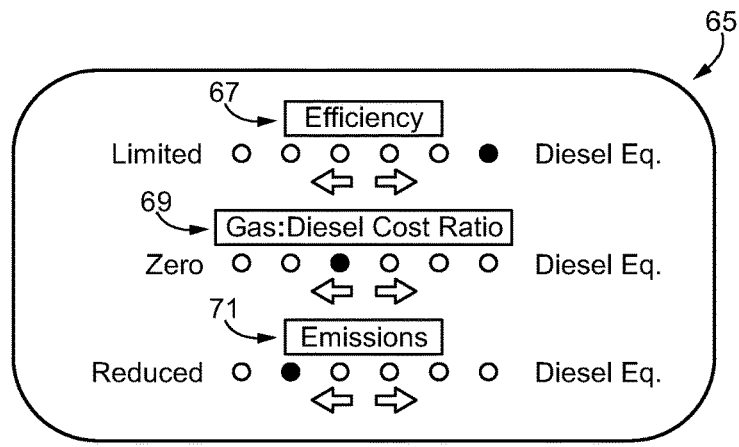
FIG. 5 is a concept diagram for a user interface in a dual fuel engine control system, according to one embodiment.

Referring now to FIG. 5, there is shown an illustration of user interface 65 as it might appear where combustion optimization terms for Efficiency 67, Gas:Diesel cost ratio 69, and Emissions 71 are shown. User interface 65 could include a touch screen, for example, with the arrows in FIG. 5 (not numbered) enabling a user to adjust a desired value of the subject combustion optimization terms. With regard to Efficiency 67, it can be appreciated that values can be selected in a finite range from limited efficiency to diesel equivalency. With regard to Gas:Diesel cost ratio 69, a value can be selected from zero to diesel equivalency, whereas for Emissions 71 a value can be selected from reduced emissions to diesel equivalency. In the illustration, diesel equivalency is selected for Efficiency 67, a middle value is selected for Gas:Diesel cost ratio 69, and a value less than a middle value, but not a lowest value, is selected for Emissions 71. It will further be appreciated that combustion optimization term(s) 74 from FIG. 2 could include stored values corresponding to those depicted in FIG. 5. A user could, by way of user input 88, reconfigure one or more of combustion optimization term(s) 74 with an updated value. For instance, a user could adjust Emissions 71 upward toward diesel equivalency where jurisdictional regulations on emissions, such as carbon dioxide emissions, NOx emissions, particulate matter emissions, or others have changed, or where engine system 10 is moved from one jurisdiction to another. A user could adjust Gas:Diesel cost ratio 69 up or down where fuel prices change, and could adjust Efficiency 67 toward limited efficiency for various other reasons. In one embodiment, electronic control unit 62 could determine a gas-to-liquid substitution ratio on the basis of a numerical average, such as a mean, of the values of the plurality of combustion optimization terms. Combustion optimization term 74 stored on memory 68 could be that numerical average. In other instances, certain of the terms could be weighted differently than others, or still another strategy could be used. It is contemplated that higher prioritization of efficiency will justify a value of Efficiency 67 closer to diesel equivalency, whereas at least for certain emissions, such as $CO_2$ emissions, higher prioritization of low emissions could justify a value for Emissions 71 that is closer to the minimum, reduced value. The range of values for any one of the combustion optimization terms could be whole numbers from 0-5, for example, although embodiments are contemplated where a different scheme is used. For instance, each combustion optimization term could have a value that is 0 or 1 meaning that the subject combustion optimization term is either considered or not considered, respectively, in the determination of gas-to-liquid substitution ratio or other controlled characteristics. The gas-to-liquid substitution ratio can thus be based on the value of the combustion optimization term, and in general a value closer to diesel equivalency will be associated with a lower gas-to-liquid substitution ratio, and vice versa. Other parameters such as those shown as outputs 94, 95, 96, and 99 in FIG. 2 can also be varied on the basis of the value of the combustion optimization term.

INDUSTRIAL APPLICABILITY

Figure 6:
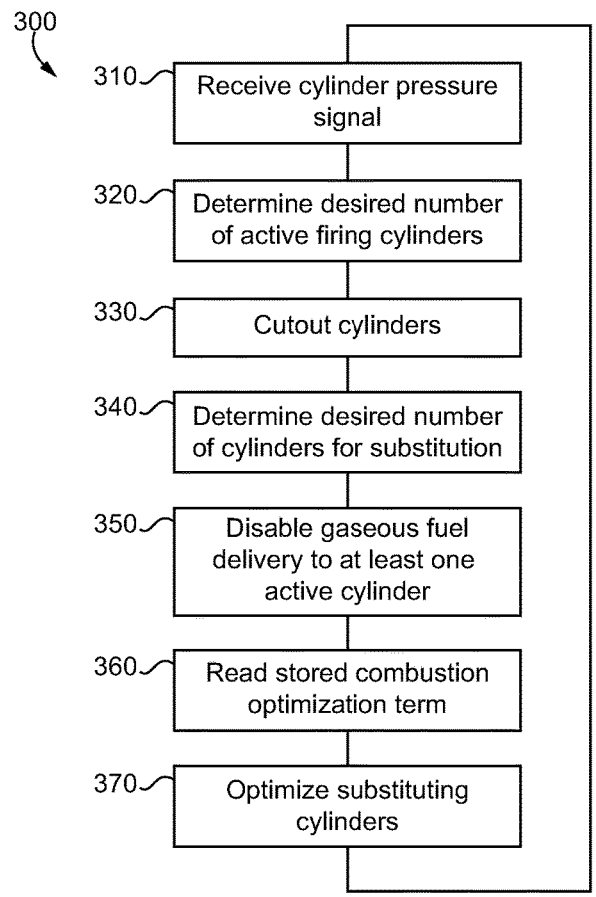
FIG. 6 is a flowchart illustrating control logic and process flow, according to one embodiment.

Referring to the drawings generally, but in particular now to FIG. 6, there is shown a flowchart 300 illustrating example process and control logic flow according to one embodiment. At a block 310 electronic control unit 62 can receive the cylinder pressure signal, and the logic can then advance to block 320 to determine a desired number of active firing cylinders. As discussed herein, determining a desired number of active firing cylinders can be based on pressure margin or another cylinder pressure or other property that is indicative of a number of cylinders that can be fired and still accommodate a present engine load demand.

From block 320 the logic can advance to block 330 to cut out at least one of combustion cylinders 16. Cutting out combustion cylinders 16 can include, for instance, disabling gaseous fuel delivery and disabling liquid fuel injection to the one or more cylinders selected for cutting out. From block 330 the logic can advance to block 340 to determine a desired number of cylinders for substitution. From block 340, the logic can advance to block 350 to disable gaseous fuel delivery to at least one active cylinder. From block 350 the logic can advance to block 360 to read one or more stored combustion optimization terms. From block 360 the logic can advance to block 370 to optimize the substituting cylinders as discussed herein.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating a dual fuel engine system comprising:
   firing each of a plurality of combustion cylinders in the dual fuel engine system on a liquid fuel or on both the liquid fuel and a gaseous fuel;
   receiving a cylinder pressure signal;
   cutting out at least one of the plurality of combustion cylinders based on the cylinder pressure signal;
   firing those combustion cylinders which remain active after the cutting out of at least one of the plurality of combustion cylinders;
   reading a stored combustion optimization term; and
   substituting, at a gas-to-liquid substitution ratio that is based on the combustion optimization term, gaseous fuel for liquid fuel in a subset of those combustion cylinders which remain active after the cutting out of at least one of the plurality of combustion cylinders.

2. The method of claim 1 wherein the stored combustion optimization term is one of a plurality of user-settable terms each having a finite range of values.

3. The method of claim 2 further comprising reading a plurality of the user-settable terms, and wherein the gas-to-liquid substitution ratio is based on each of the plurality of user-settable combustion optimization terms.

4. The method of claim 3 wherein the plurality of user-settable terms includes an efficiency term, an emissions term, and a fuel cost term.

5. The method of claim 1 further comprising updating the combustion optimization term, and varying the gas-to-liquid substitution ratio based on the updated combustion optimization term.

6. The method of claim 1 wherein the cylinder pressure signal is indicative of an indicated mean effective pressure (IMEP), and the cutting out of at least one of the plurality of combustion cylinders includes cutting out a number of the combustion cylinders that is based on the IMEP.

7. The method of claim 1 further comprising determining a number of combustion cylinders in the subset of those combustion cylinders which remain active based on a substitution distributability criterion.

8. The method of claim 7 further comprising delivering only the liquid fuel to a second subset of those combustion cylinders which remain active.

9. A dual fuel engine control system comprising:
   a pressure sensor structured for positioning in fluid communication with one of a plurality of combustion cylinders in a dual fuel engine system;
   an electronic control unit structured to couple with each of the pressure sensor, a plurality of liquid fuel admission valves, and at least one gaseous fuel admission valve;
   the electronic control unit being further structured to:
      output liquid fueling commands and gaseous fueling commands, such that each of the plurality of combustion cylinders is fired on a liquid fuel or on both of the liquid fuel and a gaseous fuel;
      receive a cylinder pressure signal from the pressure sensor;
      cut out at least one of the plurality of combustion cylinders from firing based on the cylinder pressure signal;
      read a stored combustion optimization term; and
      output liquid fueling commands and gaseous fueling commands, such that a subset of those combustion cylinders which remain active is fired at a gas-to-liquid substitution ratio that is based on the combustion optimization term.

10. The system of claim 9 further comprising a user interface coupled with the electronic control unit and structured to update the combustion optimization term responsive to a user input.

11. The system of claim 10 wherein the electronic control unit is further structured to vary the gas-to-liquid substitution ratio based on the updated combustion optimization term.

12. The system of claim 10 further comprising a memory, and wherein the combustion optimization term is one of a plurality of user-settable combustion optimization terms stored on the memory.

13. The system of claim 12 wherein the plurality of user-settable combustion optimization terms includes at least one of an efficiency term, an emissions term, or a fuel cost term.

14. The system of claim 13 wherein each one of the plurality of user-settable combustion optimization terms has a finite range of values and includes a diesel equivalency value within the corresponding finite range of values.

15. The system of claim 9 wherein the electronic control unit is further structured to determine a number of combustion cylinders in the subset of those combustion cylinders which remain active.

16. The system of claim 15 wherein the electronic control unit is further structured to determine the number of combustion cylinders in the subset based on a substitution distributability criterion.

17. A dual fuel engine system comprising:
an engine having an engine housing with a plurality of combustion cylinders formed therein;
a dual fuel system coupled with the engine and having a plurality of liquid fuel admission valves for conveying a liquid fuel into the plurality of combustion cylinders, and at least one gaseous fuel admission valve for conveying a gaseous fuel into the plurality of combustion cylinders;
a dual fuel engine control system including a plurality of pressure sensors in fluid communication with the plurality of combustion cylinders, and an electronic control unit;
the electronic control unit being structured to:
output liquid fueling commands and gaseous fueling commands, such that each of the plurality of combustion cylinders is fired on a liquid fuel or on both of the liquid fuel and a gaseous fuel;
receive a cylinder pressure signal from the pressure sensor;
cut out at least one of the plurality of combustion cylinders from firing based on the cylinder pressure signal;
read a stored combustion optimization term; and
output liquid fueling commands and gaseous fueling commands, such that a subset of those combustion cylinders which remain active is fired at a gas-to-liquid substitution ratio that is based on the combustion optimization term.

18. The system of claim 17 wherein the combustion optimization term includes an efficiency term, an emissions term, or a fuel cost term.

19. The system of claim 18 further comprising a user interface coupled with the electronic control unit and structured to update the combustion optimization term responsive to a user input.

20. The system of claim 19 wherein the combustion optimization term has a finite range of values and includes a diesel equivalency value within the corresponding finite range of values.

* * * * *